（12） United States Patent
Kiyama et al.

(10) Patent No.: US 11,649,962 B2
(45) Date of Patent: May 16, 2023

(54) BURNER AND COMBUSTION DEVICE

(71) Applicant: MITSUBISHI POWER, LTD., Yokohama (JP)

(72) Inventors: Kenji Kiyama, Yokohama (JP); Yasuhiro Yamauchi, Yokohama (JP); Kenichi Ochi, Yokohama (JP); Hitoshi Taniguchi, Yokohama (JP); Kosuke Kitakaze, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 249 days.

(21) Appl. No.: 17/056,124

(22) PCT Filed: May 13, 2019

(86) PCT No.: PCT/JP2019/018938
§ 371 (c)(1),
(2) Date: Nov. 17, 2020

(87) PCT Pub. No.: WO2019/225382
PCT Pub. Date: Nov. 28, 2019

(65) Prior Publication Data
US 2021/0364163 A1      Nov. 25, 2021

(30) Foreign Application Priority Data
May 22, 2018   (JP) .............................. JP2018-098016

(51) Int. Cl.
*F23D 17/00*   (2006.01)
*F23J 7/00*    (2006.01)
(Continued)

(52) U.S. Cl.
CPC .............. *F23D 17/005* (2013.01); *F23C 1/12* (2013.01); *F23D 1/00* (2013.01); *F23J 7/00* (2013.01);
(Continued)

(58) Field of Classification Search
None
See application file for complete search history.

(56) References Cited

U.S. PATENT DOCUMENTS 4,519,993 A  *  5/1985  McGill ................... F23C 9/00
                                                        423/235
4,807,541 A     2/1989  Masai et al.
(Continued)

FOREIGN PATENT DOCUMENTS

JP    56-075507 U    6/1981
JP    57-061125 B2   12/1982
(Continued)

OTHER PUBLICATIONS

International Search Report dated Jun. 11, 2019, issued in counterpart application No. PCT/JP2019/018938 (2 pages).

*Primary Examiner* — David J Laux
(74) *Attorney, Agent, or Firm* — WHDA, LLP

(57) ABSTRACT

A burner characterized by being equipped with: a fuel supply nozzle to which a mixed flow of a solid fuel and a solid fuel transport gas is supplied; a flow passage that is arranged on the outside of the fuel supply nozzle and that supplies combustion air separated from the mixed flow; and ammonia supply nozzles which are capable of supplying ammonia on the downstream side of the outlet of the fuel supply nozzle toward a reduction region in which oxygen in the transport gas has been consumed due to ignition of the fuel and the progress of combustion, resulting in a low oxygen concentration. Thus, it is possible to provide a burner capable of burning a mixture of a solid fuel and ammonia, and a combustion device equipped with this burner.

18 Claims, 7 Drawing Sheets

(51) Int. Cl.
*F23C 1/12* (2006.01)
*F23D 1/00* (2006.01)

(52) U.S. Cl.
CPC ...... *F23D 2200/00* (2013.01); *F23D 2204/20* (2013.01)

(56) References Cited

U.S. PATENT DOCUMENTS

| | | | |
|---|---|---|---|
| 4,915,619 A | 4/1990 | LaRue | |
| 6,883,444 B2* | 4/2005 | Logan | F23G 7/001 110/345 |
| 2002/0152937 A1* | 10/2002 | Logan | F23G 7/001 110/341 |
| 2003/0108831 A1* | 6/2003 | Harada | B01D 53/58 431/2 |
| 2003/0110994 A1* | 6/2003 | Lissianski | F23G 5/16 110/345 |

FOREIGN PATENT DOCUMENTS

| | | |
|---|---|---|
| JP | 61-22105 A | 1/1986 |
| JP | 4-214102 A | 8/1992 |
| JP | 6-023607 B2 | 3/1994 |
| JP | 2526236 B2 | 8/1996 |
| JP | 2000-314508 A | 11/2000 |
| JP | 3344694 B2 | 11/2002 |
| JP | 2004-301372 A | 10/2004 |
| JP | 5794419 B2 | 10/2015 |
| JP | 6296216 B1 | 3/2018 |

* cited by examiner

SPRAY DIRECTION OF AMMONIA

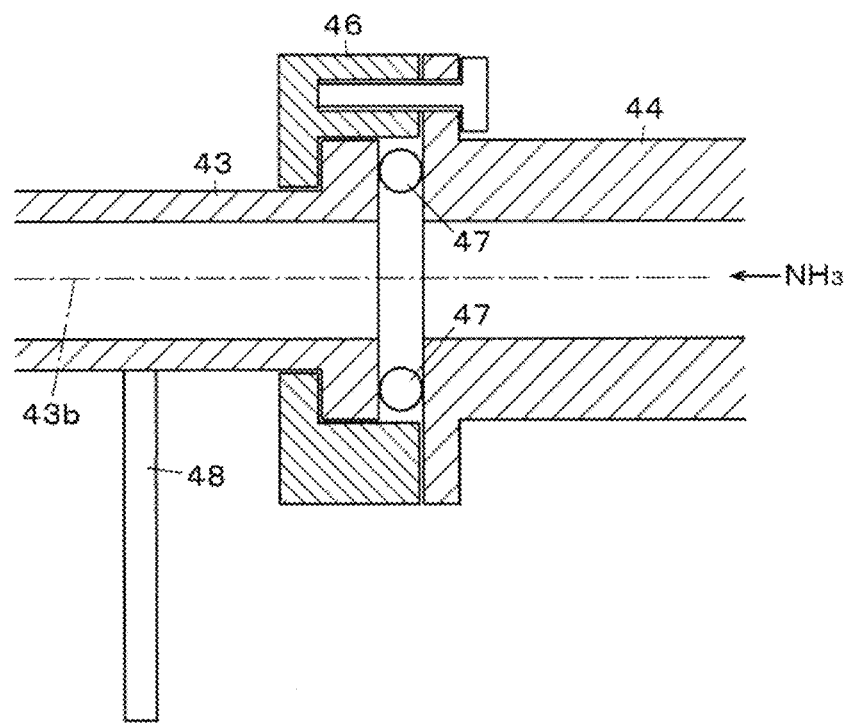

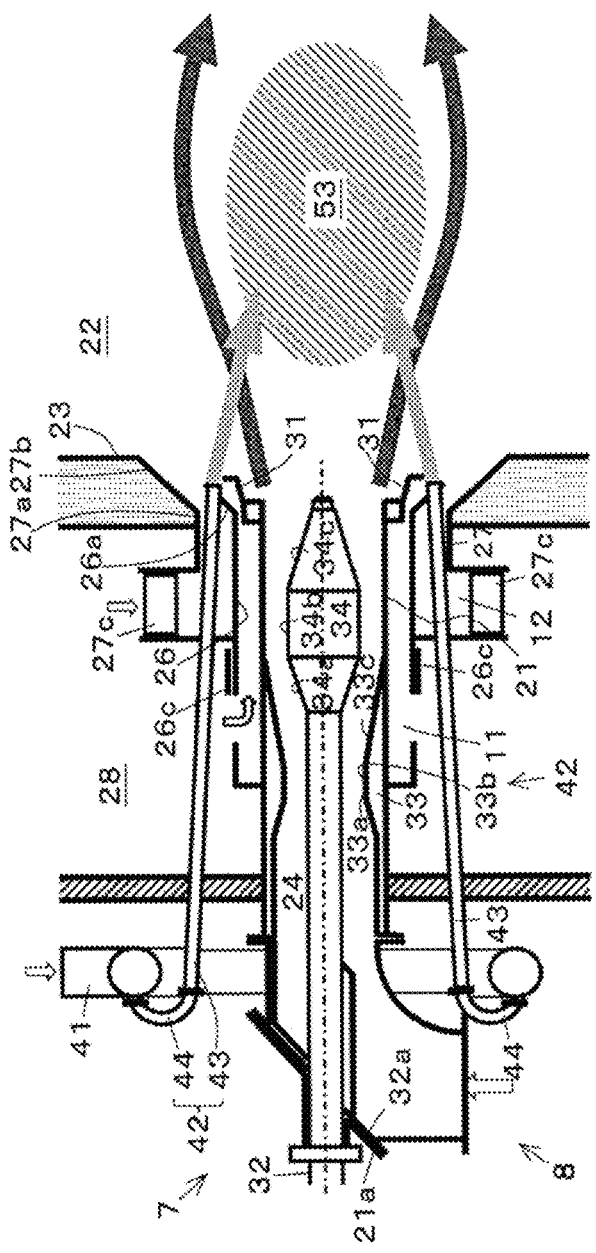
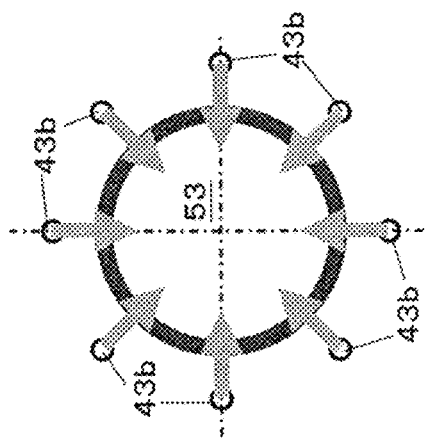
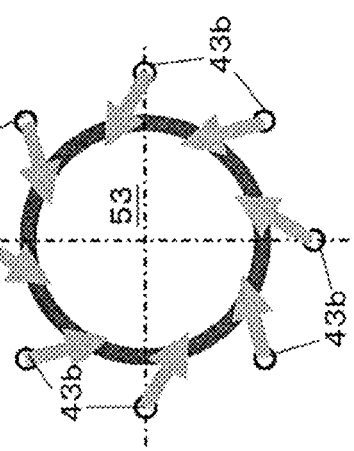

BURNER AND COMBUSTION DEVICE

TECHNICAL FIELD

The present invention relates to a burner which uses a solid fuel and a combustion device having the burner.

BACKGROUND ART

In a burner to burn a solid fuel such as pulverized coal obtained by crushing coal, a technique for expanding a reduction region on a downstream side of an opening end of the burner by installing a secondary air nozzle on an outer peripheral side of a fuel nozzle to expand a secondary air by a guide vane is known in the art (Patent Documents 1 to 3).

Further, in a burner which uses a gas fuel such as liquefied natural gas (LNG), a technique for adjusting an spray direction and an angle of the gas fuel in order to reduce NOx is also known in the art (Patent Documents 4 and 5).

Further, a technique, in which a pulverized coal burner and a gas burner are combined in order to support operating by switching a solid fuel and a gas fuel, is also known in the art (Patent Documents 6 and 7).

PRIOR ART DOCUMENT

Patent Document

Patent Document 1: Japanese Unexamined Patent Application Publication No. H04-214102
Patent Document 2: Japanese Patent No. 3344694
Patent Document 3: Japanese Patent No. 5794419
Patent Document 4: Japanese Utility Model Publication No. S56-075507
Patent Document 5: Japanese Examined Patent Publication No. S57-061125
Patent Document 6: Japanese Patent No. 2526236
Patent Document 7: Japanese Examined Patent Publication No. H06-023607

SUMMARY OF INVENTION

Technical Problem

When ammonia ($NH_3$) is used as a fuel, $CO_2$ is not generated after the combustion, such that research on direct combustion of $CO_2$-free ammonia has been carried out. As a point to be considered at the time of combustion, a general gas fuel such as natural gas as described in Patent Documents 4 and 5 contains almost no nitrogen (N), whereas ammonia contains an excessive N component of 82% by weight ratio, and easily generates NOx. This has commonality with coal which also contains an N component in the fuel.

There is a distribution of high and low oxygen concentration in the boiler, but if ammonia can be injected into a primary combustion region (reduction region) of a solid fuel burner, which is a reduction condition at all times (see Patent Documents 1 to 3), it is possible to stably perform mixed combustion in which an increase of NOx is suppressed.

In the configurations described in Patent Documents 6 and 7, a downstream end of a gas nozzle for supplying gas fuel is disposed on the downstream side of a flame holder. In the techniques described in Patent Documents 6 and 7, since using by switching the solid fuel and the gas fuel is a prerequisite, and performing mixed combustion of the solid fuel and the gas fuel is not a prerequisite, even if the gas nozzle extends to the downstream side of the flame holder, there is less problem. However, when performing mixed combustion with the configurations of Patent Documents 6 and 7, there is a problem that the gas nozzle on the downstream side of the flame holder is burnt out.

It is a technical object of the present invention to provide a burner capable of mixedly combusting a solid fuel and ammonia and a combustion device including the burner.

Solution to Problem

The above object of the present invention may be achieved by employing the following configurations.

An invention of a first aspect of the present invention is a burner including: a fuel supply nozzle to which a mixed flow of a solid fuel and a carrier gas for the solid fuel is supplied; a flow passage which is disposed on an outside of the fuel supply nozzle to supply a combustion air separately from the mixed flow; and an ammonia supply nozzle configured to supply ammonia toward a reduction region in which oxygen in the carrier gas is consumed by ignition and combustion progress of a fuel on a downstream side of an outlet of the fuel supply nozzle to be a low oxygen concentration.

An invention of a second aspect of the present invention is the burner according to the first aspect of the present invention, further including a first guide member which is installed at a tip portion of a partition wall between the mixed flow and the combustion air to guide the combustion air so as to be separated from the mixed flow.

An invention of a third aspect of the present invention is the burner according to the second aspect of the present invention, wherein the ammonia supply nozzle is provided so that a downstream end thereof is disposed on an upstream side of a flow of the combustion air with respect to the first guide member.

An invention of a fourth aspect of the present invention is the burner according to any one of the first to third aspects of the present invention, further including a second guide member which is installed at an outlet part of the flow passage of the combustion air to strengthen a separation of an outer peripheral air from the mixed flow.

An invention of a fifth aspect of the present invention is the burner according to the fourth aspect of the present invention, wherein the ammonia supply nozzle is provided so that a downstream end thereof is disposed on a downstream side of the flow of the combustion air with respect to the second guide member.

An invention of a sixth aspect of the present invention is the burner according to any one of the first to fifth aspects of the present invention, further including a swirl generating device which is disposed in the flow passage of the combustion air to separate the combustion air from the mixed flow.

An invention of a seventh aspect of the present invention is the burner according to any one of the first to sixth aspects of the present invention, wherein the ammonia supply nozzle is provided so that an injection angle of ammonia thereof is adjustable.

An invention of an eighth aspect of the present invention is the burner according to any one of the first to seventh aspects of the present invention, wherein a ratio of heat input due to combustion of the solid fuel to heat input due to combustion of the ammonia is adjustable.

An invention of a ninth aspect of the present invention is the burner according to the eighth aspect of the present invention, wherein the ratio of heat input due to combustion of the ammonia is 50% or less.

An invention of a tenth aspect of the present invention is a combustion device including: a furnace in which the burner according to any one of the first to seventh aspects is installed; and an additional nozzle configured to separate and supply a part of the combustion air onto the downstream side of the burner in the furnace.

An invention of an eleventh aspect of the present invention is the combustion device according to the tenth aspect of the present invention, wherein a total air flow rate supplied from the burner is set to be a theoretical air amount or less.

An invention of a twelfth aspect of the present invention is the burner according to the fourth aspect of the present invention, wherein the ammonia supply nozzle is installed by penetrating the second guide member to supply the ammonia to the reduction region.

ADVANTAGEOUS EFFECTS

In accordance with the invention according to the first aspect, it is possible to provide a burner capable of mixedly combusting the solid fuel and ammonia by supplying ammonia toward the reduction region, in which an increase of nitrogen oxide is suppressed, while using the ammonia as a gas fuel.

In accordance with the invention according to the second aspect, in addition to the effect of the first aspect of the present invention, as compared with the case in which the combustion air is not separated from the mixed flow by the first guide member, it is difficult for the combustion air to be mixed in the reduction region, and it is possible to generate a reduction region with strong reduction.

In accordance with the invention according to the third aspect, in addition to the effect of the second aspect of the present invention, as compared with the case in which the downstream end of the ammonia supply nozzle is not disposed on the upstream side of the flow of combustion air with respect to the first guide member, it is possible to suppress the ammonia supply nozzle from being burnt out.

In accordance with the invention according to the fourth aspect, in addition to the effect of any one of the first to third aspects of the present invention, as compared with the case in which a separation of the outer peripheral air from the mixed flow is not strengthened by the second guide member, it is difficult for the combustion air to be mixed in the reduction region, and it is possible to generate a reduction region with strong reduction.

In accordance with the invention according to the fifth and twelfth aspects, in addition to the effect of the fourth aspect of the present invention, ammonia may be supplied without being affected by the flow of the combustion air spreading along the second guide member, and ammonia is likely to be supplied to the reduction region.

In accordance with the invention according to the sixth aspect, in addition to the effect of any one of the first to fifth aspects of the present invention, as compared with the case in which the outer peripheral air from the mixed flow is not separated by the swirl generating device, it is difficult for the combustion air to be mixed in the reduction region, and it is possible to generate a reduction region with strong reduction.

In accordance with the invention according to the seventh aspect, in addition to the effect of any one of the first to sixth aspects of the present invention, it is possible to adjust the distribution of ammonia in the reduction region.

In accordance with the invention according to the eighth aspect, in addition to the effect of any one of the first to seventh aspects of the present invention, by adjusting the ratio of heat input due to combustion of the solid fuel to heat input due to combustion of the ammonia, it is possible to suppress an increase of nitrogen oxide by optimizing the combustion.

In accordance with the invention according to the ninth aspect, in addition to the effect of the eighth aspect of the present invention, by setting the ratio of heat input due to combustion of the ammonia to be 50% or less, it is possible to secure the flow rate of the solid fuel required for stabilizing the flame.

In accordance with the invention according to the tenth aspect, as compared with the case in which the additional nozzle is not provided, it is possible to suppress an increase of nitrogen oxide.

In accordance with the invention according to the eleventh aspect, in addition to the effect of the tenth aspect of the present invention, by setting the total air flow rate supplied from the burner to be the theoretical air amount or less, it is possible to suppress a reduction of the reduction action, and suppress an increase of nitrogen oxide.

BRIEF DESCRIPTION OF DRAWINGS

FIG. 6 is a detailed view describing a connection portion between a body of the ammonia supply nozzle and a curved nozzle connection part.

FIGS. 7(A), 7(B) and 7(C) are views describing a supply direction of ammonia, Wherein. FIG. 7(A) is an explanatory view corresponding to FIG. 2, FIG. 7(B) is an explanatory view when injecting ammonia obliquely in a central axis direction, and FIG. 7(C) is an explanatory view when injecting ammonia obliquely deviating from a central axis.

DESCRIPTION OF EMBODIMENTS

Hereinafter, embodiments of the present invention will be described.

Embodiment 1

Figure 1:
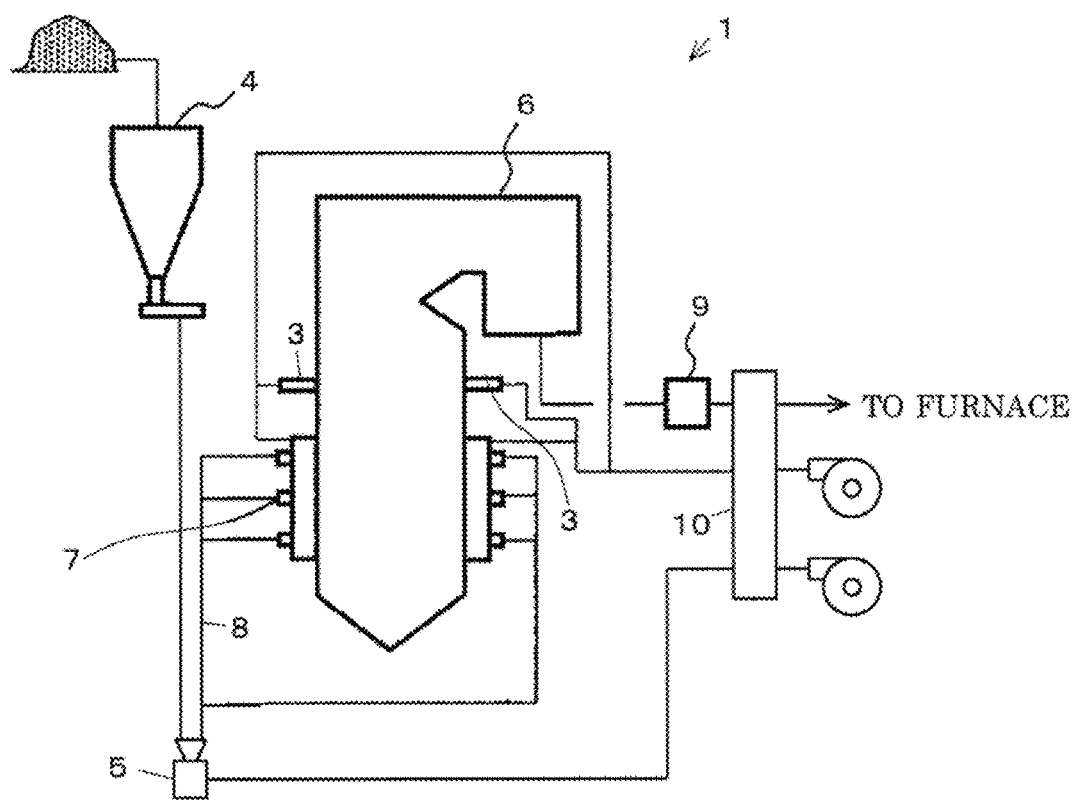
FIG. 1 is an entire view describing a combustion system according to Embodiment 1 of the present invention.

FIG. 1 is an entire view describing a combustion system according to Embodiment 1 of the present invention.

In FIG. 1, in a combustion system (combustion device) 1 of Embodiment 1 used in a thermal power generation plant, and the like, pulverized coal (solid fuel) is housed in a bunker (fuel hopper) 4. The solid fuel of the bunker 4 is crushed by a mill (crusher) 5. The crushed fuel is supplied to a burner 7 of a boiler 6 through a fuel pipe 8 and burned. In addition, a plurality of burners 7 are installed in the boiler 6. Further, the solid fuel is not limited to the pulverized coal, and for example, biomass fuel may also be used.

The boiler 6 includes an additional nozzle 3 installed on a downstream side (upper side) of the burner 7 to supply a combustion air.

Figure 2:
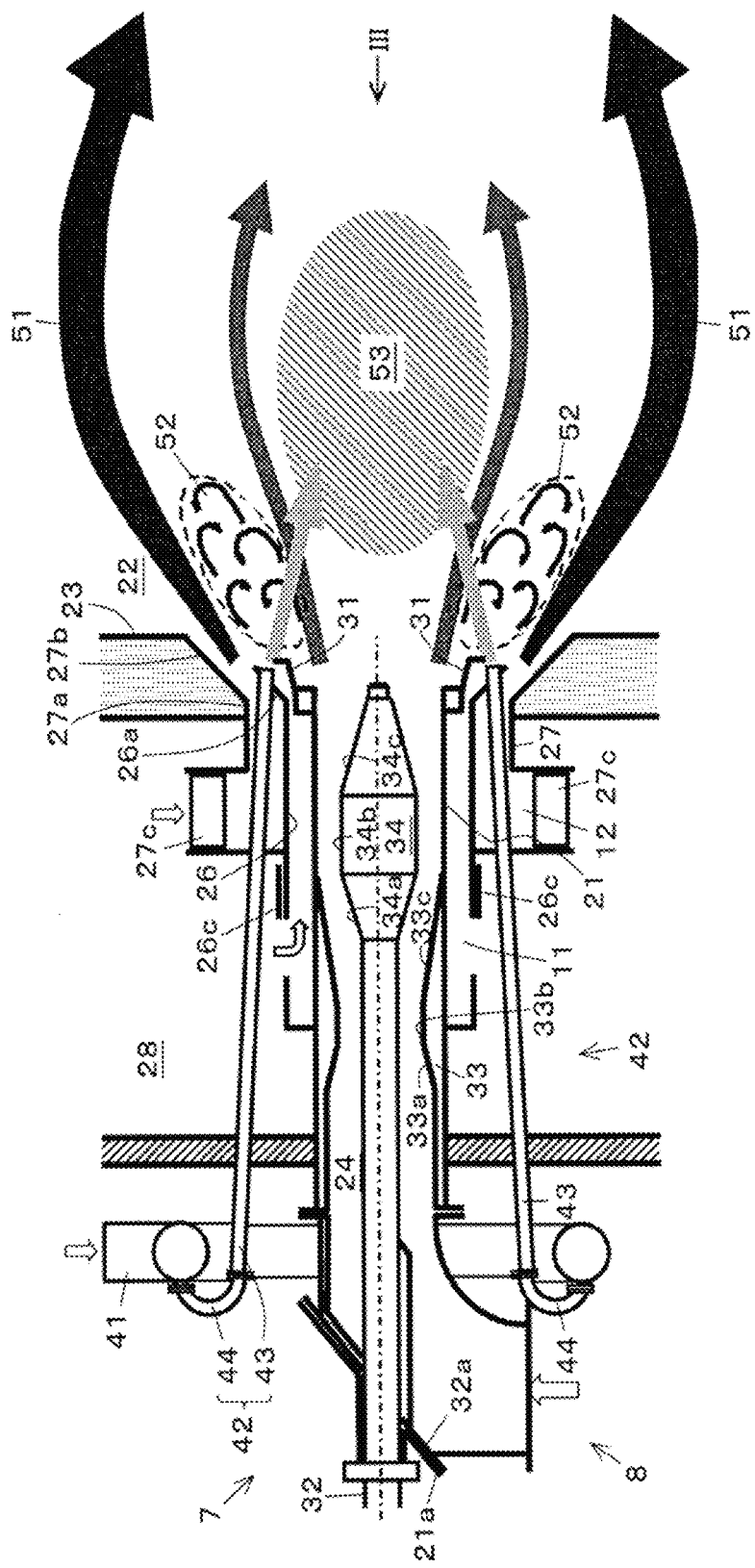
FIG. 2 is a view describing a burner of Embodiment 1.

FIG. 2 is a view describing the burner of Embodiment 1.

Figure 3:
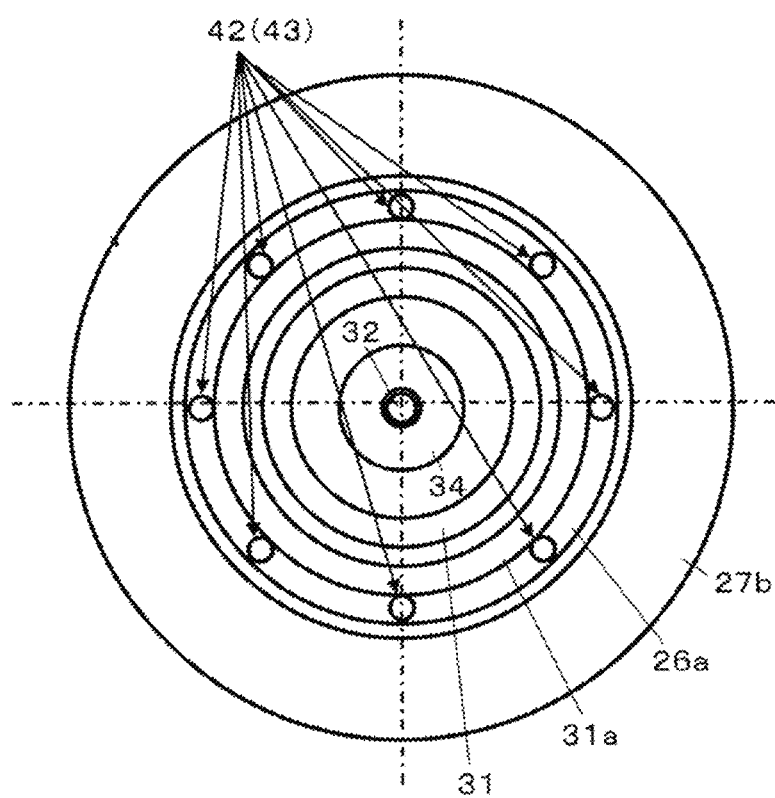
FIG. 3 is a view as seen from an arrow HI direction in FIG. 2.

FIG. 3 is a view as seen from an arrow III direction in FIG. 2.

In FIGS. 2 and 3, the burner (mixed combustion burner) 7 of Embodiment 1 has a fuel nozzle 21 through which a mixed flow flows. The fuel nozzle 21 has an opening at a downstream end thereof, which is disposed in the vicinity of a wall surface (furnace wall, water pipe wall) 23 of a furnace 22 of the boiler 6. An upstream side of the fuel nozzle 21 is connected with the fuel pipe 8. The fuel nozzle 21 is formed in a hollow cylindrical shape. The fuel nozzle 21 has a flow passage 24 formed therein, through which a solid fuel (pulverized coal) and a carrier gas thereof flow.

An inner combustion air nozzle (secondary combustion air nozzle) 26 is installed on an outer periphery of the fuel nozzle 21 to spray a combustion air to the furnace 22. The secondary combustion air nozzle 26 has a secondary air flow passage 11 formed therein, through which a secondary air (secondary combustion air) flows.

Further, an outer combustion air nozzle (tertiary combustion air nozzle) 27 is installed on an outer peripheral side of the inner combustion air nozzle 26. The tertiary combustion air nozzle 27 has a tertiary air flow passage 12 formed therein, through which a tertiary air (tertiary combustion air) flows.

Each of the combustion air nozzles 26 and 27 sprays air from a wind box (wind case) 28 toward an inside of the furnace 22. In Embodiment 1, a guide vane (first guide member) 26a is formed at the downstream end of the inner combustion air nozzle 26, which is inclined radially outward with respect to a center of the fuel nozzle 21 (a diameter thereof is increased toward the downstream side). In addition, the outer combustion air nozzle 27 includes a throat part 27a along an axial direction and an expansion part 27b parallel to the guide vane 26a, which are formed in the downstream portion thereof. Therefore, the combustion air sprayed from the respective combustion air nozzles 26 and 27 is sprayed so as to be diffused from the center in the axial direction (guided so as to be separated from the mixed flow of the flow passage 24).

In FIG. 2, the inner combustion air nozzle 26 includes a slide type damper 26c installed in an upstream portion thereof to adjust the flow rate of the secondary combustion air (secondary air).

In addition, the outer combustion air nozzle 27 includes a swirl generating device 27c installed in the upstream portion thereof to impart a swirling component to the tertiary combustion air (tertiary air).

Further, a flame holder 31 is installed in an opening portion of the downstream end of the fuel nozzle 21. The flame holder 31 includes a guide vane (first second guide member) 31a formed on a radial outside thereof with extending outward in a radial direction. Therefore, the combustion air flowing through the inner combustion air nozzle 26 is guided so as to be separated to an outside in the radial direction with respect to the mixed flow flowing through the flow passage 24 by the guide vane 31a of the flame holder 31.

In FIG. 2, a venturi 33 is installed on an inner wall surface of the fuel nozzle 21. The venturi 33 has a diameter contraction part 33a on the upstream side, a minimum diameter part 33b continued to the downstream side of the diameter contraction part 33a, and a diameter expansion part 33c continued to the downstream side of the minimum diameter part 33b. In the diameter contraction part 33a, an inner diameter of the flow passage 24 is reduced toward the downstream side. In addition, in the diameter expansion part 33c, the inner diameter of the flow passage 24 is increased toward the downstream side.

Therefore, in the venturi 33 of Embodiment 1, the mixed fluid of the fuel and the carrier gas supplied to the fuel nozzle 21 is narrowed inward in the radial direction when passing through the diameter contraction part 33a. Therefore, it is possible to move the fuel biased in the vicinity of the inner wall surface of the fuel nozzle 21 to the center side.

A fuel concentrator 34 is installed on the downstream side of the venturi 33. The fuel concentrator 34 has a diameter expansion part 34a on the upstream side, a maximum diameter part 34b continued to the downstream side of the diameter expansion part 34a, and a diameter contraction part 34c continued to the downstream side of the maximum diameter part 34b. An outer diameter of the diameter expansion part 34a is increased toward the downstream side. The outer diameter of the diameter contraction part 34c is reduced toward the downstream side.

Therefore, in the fuel concentrator 34 of Embodiment 1, a velocity component toward the outer side in the radial direction is imparted to the mixed fluid of the fuel and the carrier gas when passing through the diameter expansion part 34a. Thereby, the fuel is condensed toward the inner wall surface of the fuel nozzle 21.

In FIG. 2, an ammonia supply pipe 41 is disposed on the outside of an outer wall of the wind box 28. A high-pressure ammonia gas (gas fuel) is supplied to the ammonia supply pipe 41. A plurality of ammonia supply nozzles 42 are connected to the ammonia supply pipe 41. In the present embodiment, as illustrated in FIG. 3, eight ammonia supply nozzles 42 are disposed at an interval along a circumferential direction.

The ammonia supply nozzle 42 has a straight tubular nozzle body 43, and a curved nozzle connection part 44 which connects the nozzle body 43 and the ammonia supply pipe 41.

Figure 4:
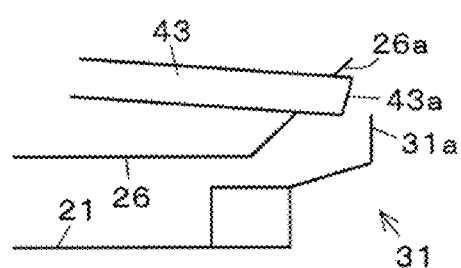
FIG. 4 is an enlarged view of a tip portion of an ammonia supply nozzle in the burner of the present embodiment.

FIG. 4 is an enlarged view of a tip portion of the ammonia supply nozzle in the burner of the present embodiment.

Figure 5:
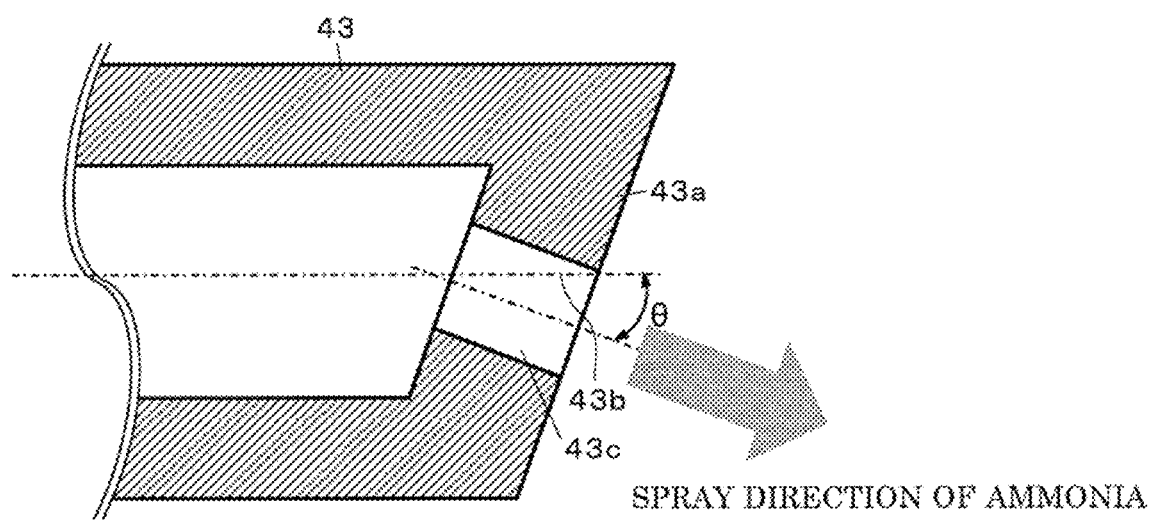
FIG. 5 is a cross-sectional view of a major part of the tip portion of the ammonia supply nozzle.

FIG. 5 is a cross-sectional view of a major part of the tip portion of the ammonia supply nozzle.

In FIG. 2, the nozzle body 43 is rotatably supported by the ammonia supply pipe 41 through a guide pipe and a seal (not illustrated) about an axial direction 43b. The nozzle body 43 penetrates the wall surfaces of the wind box 28, the outer combustion air nozzle 27, and the inner combustion air nozzle 26. In FIGS. 2 and 4, a downstream end 43a of the nozzle body 43 is disposed on the downstream side of the guide vane 26a installed at the end portion of the inner combustion air nozzle 26, and on the upstream side of the guide vane 31a installed in the flame holder 31, with respect to the flow direction of the combustion air.

FIG. 6 is a detailed view describing a connection portion between the body of the ammonia supply nozzle and the curved nozzle connection part.

FIGS. 7(A), 7(B) and 7(C) are views describing a supply direction of ammonia, wherein FIG. 7(A) is an explanatory view corresponding to FIG. 2, FIG. 7(B) is an explanatory view when injecting ammonia obliquely in a central axis direction, and FIG. 7(C) is an explanatory view when injecting ammonia obliquely deviating from a central axis.

In FIG. 5, an injection port 43c which is inclined at an angle θ with respect to the axial direction 43b is formed in the tip portion of the nozzle body 43. In addition, in FIG. 6, the nozzle body 43 of this embodiment is rotatably supported about the axial direction 43b with respect to a receiving part 46 fixedly supported by the connection part 44. Further, the nozzle body 43 and the connection part 44 are sealed (closed) through an O-ring 47. A handle 48 for adjusting rotation is installed on the nozzle body 43. By manually operating the handle 48 to adjust the rotation at the time of trial operation or maintenance, an injection direction may be freely set as illustrated in FIGS. 7(B) and 7(C).

Operation of Embodiment 1

In the burner 7 of Embodiment 1 having the above-described configuration, the mixed fluid of the pulverized coal and the carrier gas is sprayed from the fuel nozzle 21 into the furnace 22. In addition, the combustion air is divided into an inner combustion air (secondary air) and an outer combustion air (tertiary air) to be supplied to the furnace 22. The secondary air is expanded to the outside by the guide vane 31a installed in the flame holder 31, and the tertiary air is expanded to the outside by the guide vane 26a installed in the inner combustion air nozzle 26 to be supplied, such that a circulation vortex 52 is formed between the mixed fluid and the outer peripheral air 51 composed of the secondary air and the tertiary air. Since a high-temperature gas in the furnace 22 is returned to an outlet part of the burner 7 by riding on a circulation flow in the circulation vortex 52, the mixed fluid is rapidly ignited in the vicinity of the outlet of the burner 7.

Herein, the pulverized coal supplied from the fuel nozzle 21 is concentrated on the outer peripheral side (in the vicinity of the inner wall surface of the fuel nozzle) by the fuel concentrator 34 to form a pulverized coal concentrated region. Then, the high-temperature gas in the furnace 22 is returned to the vicinity of the pulverized coal concentrated region, such that rapid ignition performance is further enhanced.

Due to the rapid ignition, a primary combustion region 53 is formed in the vicinity of the central axis of the outlet of the burner 7. Since the outer peripheral air 51 is supplied away from the primary combustion region 53, the primary combustion region 53 becomes a reduction condition of an excessive fuel (air shortage).

Specifically, due to the rapid ignition, a rapid combustion reaction progresses inside the primary combustion region 53 formed from the outlet part of the burner 7. Oxygen ($O_2$) is rapidly consumed by the progress of combustion. Then, nitrogen oxide (NO) is generated from the N component in the fuel (pulverized coal), and a hydrocarbon radical (.HC) as an intermediate product is rapidly generated from a main component of combustion. Under a condition of strengthening reduction after $O_2$ is decreased, a radical (.NX) containing a nitrogen element is generated by a reaction of the generated nitrogen oxide (NO) with the hydrocarbon radical (.HC), and NO is reduced to $N_2$ by a reaction of .NX with NO.

When ammonia ($NH_3$) is sprayed into this reduction region (primary combustion region) 53, a reduction reaction to $N_2$ progresses preferentially through the .NH radical.

Therefore, in the burner 7 of Embodiment 1, an increase of nitrogen oxide is suppressed while mixedly combusting the solid fuel and ammonia.

Further, in the burner 7 of Embodiment 1, the guide vane 31a of the flame holder 31 is installed at the tip portion of a partition wall (fuel nozzle 21) of the mixed fluid and the combustion air (outer peripheral air 51), and (the secondary air of) the outer peripheral air 51 is reliably separated from the mixed fluid. Therefore, as compared with the case in which the separation is not performed, it is possible to generate a reduction region 53 with a strong reduction condition.

Further, in the burner 7 of Embodiment 1, the separation of the outer peripheral air 51 from the mixed flow is also strengthened by the guide vane 26a of the inner combustion air nozzle 26. Thereby, as compared with the case in which the guide vane 26a is not provided, it is possible to generate the reduction region 53 with the strong reduction condition.

In addition, in the burner 7 of Embodiment 1, the swirl generating device 27c is installed in the outer combustion air nozzle 27, such that the tertiary air (outer peripheral air 51) has difficulty mixing with the mixed flow, and the separation from the mixed flow is strengthened. Therefore, as compared with the case in which the swirl generating device 27c is not provided, it is possible to generate the reduction region 53 with the strong reduction condition.

Further, in the burner 7 of Embodiment 1, the downstream end of the ammonia supply nozzle 42 is disposed on the upstream side of the guide vane 31a of the flame holder 31. If the ammonia supply nozzle 42 extends to the inside of the furnace 22 beyond the flame holder 31, the ammonia supply nozzle 42 may be burnt out. On the other hand, in Embodiment 1, the ammonia supply nozzle 42 is disposed on the upstream side of the guide vane 31a, is protected from the flame by the seal due to the secondary air sent from the upstream side, and is cooled by the secondary air. Therefore, the ammonia supply nozzle 42 is suppressed from being burnt out.

Furthermore, in the burner 7 of Embodiment 1, the downstream end of the ammonia supply nozzle 42 is disposed on the downstream side of the guide vane 26a of the inner combustion air nozzle 26. Therefore, it is possible to supply ammonia without being affected by the flow of combustion air spreading along the guide vane 26a, and the ammonia is likely to be supplied to the reduction region.

In addition, in the burner 7 of Embodiment 1, the injection direction of the ammonia supply nozzle 42 is configured to be adjustable. Therefore, as illustrated in FIG. 7(A), it is also possible to concentrate the ammonia on the central portion of the reduction region 53. Further, as illustrated in FIG. 7(B), it is also possible to bring the ammonia closer to an outer edge portion of the reduction region 53. Thereby, it is possible to freely adjust the concentration and dispersion of the ammonia in the reduction region 53. Therefore, depending on the use environment such as a type of the pulverized coal used, a ratio of the N component, an amount of combustion air, etc., and depending on an appropriate degree of dispersion for efficiently reducing the N component in ammonia to $N_2$, it is possible to adjust the injection direction.

Further, in Embodiment 1, a control valve (not illustrated) is provided in the upstream portion of the ammonia supply pipe 41, thereby it is possible to control a supply amount of ammonia. Therefore, it is possible to adjust and control a ratio (mixing ratio) of the solid fuel to ammonia depending on an appropriate ratio for efficiently reducing the N component in ammonia to $N_2$.

In particular, it is preferable to control the ratio of the pulverized coal to ammonia so that the ratio of heat input due to combustion of the ammonia is 50% or less. If the amount of the pulverized coal is reduced too much by increasing the amount of heat input of the ammonia, the flame may become unstable. Therefore, it is preferable to adjust the ratio of heat input due to the combustion of the ammonia to be 50% or less.

Further, in Embodiment 1, the additional nozzle 3 for supplying the combustion air is installed on the downstream side of the burner 7 in the furnace 22. Therefore, it is possible to reduce a generation of nitrogen oxide in the furnace 22 by performing combustion (two-stage combustion) even after the position of the additional nozzle 3 after the combustion in the burner 7.

Furthermore, in Embodiment 1, the total amount of air supplied from the burner 7 (the total amount of air, secondary air and tertiary air contained in the mixed fluid from the fuel nozzle 21) is set to be a theoretical air volume or less required for the reduction reaction in the reduction region 53. Therefore, it is possible to suppress an increase in the amount of NOx generated due to a large amount of air and weakened reduction in the reduction region 53.

Modification

Although the embodiments of the present invention have been described above in detail, the present invention is not limited to the above-described embodiments, and various modifications may be made within the scope of the present invention described in the claims. Modifications (H01) to (H04) of the present invention will be described as examples below.

(H01) In the above-described embodiment, it is preferable that the ammonia supply nozzle 42 has a configuration in which the injection direction can be adjusted, but it is not limited thereto. It is also possible to have a configuration in which the injection direction cannot be adjusted. In addition, the configuration, in which the injection direction is adjusted by rotating the nozzle body 43, has been exemplified, but it is not limited thereto. For example, it is possible to employ an arbitrary configuration such as a configuration in which a plurality of injection ports are formed in the tip portion, each injection port is configured to be opened and closed by shutters, and the shutters are opened and closed depending on the injection direction.

(H02) In the above-described embodiment, it is preferable that the downstream end of the ammonia supply nozzle 42 is on the upstream side of the guide vane 31a of the flame holder 31, and on the downstream side of the guide vane 26a of the inner combustion air nozzle 26, but it is not limited thereto. After taking measures against burning out, the downstream end thereof may be disposed on the downstream side of the guide vane 31a of the flame holder 31, or on the upstream side of the guide vane 26a of the inner combustion air nozzle 26 by increasing the injection pressure of ammonia.

(H03) In the above-described embodiment, it is preferable to provide the swirl generating device 27c, but a configuration, in which the swirl generating device is not provided, is also possible. In addition, the configuration, in which the swirl generating device 27c is installed in the upstream portion of the outer combustion air nozzle 27, has been exemplified, but it may also be provided in the downstream portion (near the outlet) thereof.

(H04) In the above-described embodiment, the shapes and sizes of the guide vanes 26a and 31a are not limited to the configurations exemplified in the embodiments, and may be arbitrarily changed depending on the design, specification and the like. In addition, a configuration, in which the guide vanes 26a and 31a are provided, is preferable, but a configuration, in which they are not provided, is also possible.

REFERENCE SIGNS LIST

1 . . . Combustion device,
3 . . . Additional nozzle,
7 . . . Burner,
21 . . . Fuel supply nozzle,
22 . . . Furnace,
26, 27 . . . Combustion air nozzle,
26a . . . First guide member,
27c . . . Swirl generating device,
31a . . . Second guide member,
42 . . . Ammonia supply nozzle,
53 . . . Reduction region.

The invention claimed is:

1. A burner comprising:
a fuel supply nozzle to which a mixed flow of a solid fuel and a carrier gas for the solid fuel is supplied;
a flow passage which is disposed on an outside of the fuel supply nozzle to supply a combustion air separately from the mixed flow;
a first guide member which is installed at an outlet part of the flow passage of the combustion air to strengthen a separation of an outer peripheral air from the mixed flow;
an ammonia supply nozzle configured to supply ammonia toward a reduction region in which oxygen in the carrier gas is consumed by ignition and combustion progress of a fuel on a downstream side of an outlet of the fuel supply nozzle to be a low oxygen concentration, and which is provided so that a downstream end thereof is disposed on a downstream side of the flow of the combustion air with respect to the first guide member.

2. The burner according to claim 1, further comprising, a second guide member which is installed at a tip portion of a partition wall between the mixed low and the combustion air to guide the combustion air so as to be separated from the mixed flow.

3. The burner according to claim 2, wherein the ammonia supply nozzle is provided so that a downstream end thereof is disposed on an upstream side of a flow of the combustion air with respect to the second guide member.

4. The burner according to claim 1, further comprising a mounted vane which is disposed in the flow passage of the combustion air to separate the combustion air from the mixed flow.

5. The burner according to claim 1, wherein the ammonia supply nozzle is provided so that an injection angle of ammonia thereof is adjustable.

6. The burner according to claim 1, wherein a ratio of heat input due to combustion of the solid fuel to heat input due to combustion of the ammonia is adjustable.

7. The burner according to claim 6, wherein the ratio of heat input due to combustion of the ammonia is 50% or less.

8. A combustion device comprising:
a furnace in which the burner according to claim 1 is installed; and
an additional nozzle configured to separate and supply a part of the combustion air onto the downstream side of the burner in the furnace.

9. The combustion device according to claim 8, wherein a total air flow rate supplied from the burner is set to be a theoretical air amount or less.

10. A burner comprising:
a fuel supply nozzle to which a mixed flow of a solid fuel and a carrier gas for the solid fuel is supplied;
a flow passage which is disposed on an outside of the fuel supply nozzle to supply a combustion air separately from the mixed flow;
an ammonia supply nozzle configured to supply ammonia toward a reduction region in which oxygen in the carrier gas is consumed by ignition and combustion progress of a fuel on a downstream side of an outlet of the fuel supply nozzle to be a low oxygen concentration;

a first guide member which is installed at an outlet part of the flow passage of the combustion air to strengthen a separation of an outer peripheral air from the mixed flow; and the ammonia supply nozzle which is installed by penetrating the first guide member to supply the ammonia to the reduction region.

11. The burner according to claim 10, further comprising a second guide member which is installed at a tip portion of a partition wall between the mixed flow and the combustion air to guide the combustion air so as to be separated from the mixed flow.

12. The burner according to claim 11, wherein the ammonia supply nozzle is provided so that a downstream end thereof is disposed on an upstream side of a flow of the combustion air with respect to the first second guide member.

13. The burner according to claim 10, further comprising a mounted vane which is disposed in the flow passage of the combustion air to separate the combustion air from the mixed flow.

14. The burner according to claim 10, wherein the ammonia supply nozzle is provided so that an injection angle of ammonia thereof is adjustable.

15. The burner according to claim 10, wherein a ratio of heat input due to combustion of the solid fuel to heat input due to combustion of the ammonia is adjustable.

16. The burner according to claim 15, wherein the ratio of heat input due to combustion of the ammonia is 50% or less.

17. A combustion device comprising:
a furnace in which the burner according to claim 10 is installed; and
an additional nozzle configured to separate and supply a part of the combustion air onto the downstream side of the burner in the furnace.

18. The combustion device according to claim 17, wherein a total air flow rate supplied from the burner is set to be a theoretical air amount or less.

* * * * *